US006963836B2

(12) United States Patent
Van Gestel

(10) Patent No.: US 6,963,836 B2
(45) Date of Patent: Nov. 8, 2005

(54) SPEECHDRIVEN SETTING OF A LANGUAGE OF INTERACTION

(75) Inventor: Henricus Antonius Wilhelmus Van Gestel, Eindhoven (NL)

(73) Assignee: Koninklijke Philips Electronics, N.V., Einhoven (NL)

( * ) Notice: Subject to any disclaimer, the term of this patent is extended or adjusted under 35 U.S.C. 154(b) by 521 days.

(21) Appl. No.: 10/023,071

(22) Filed: Dec. 17, 2001

(65) Prior Publication Data

US 2002/0082844 A1 Jun. 27, 2002

(30) Foreign Application Priority Data

Dec. 20, 2000 (EP) ............................................ 00204645

(51) Int. Cl.[7] ................................................ G10L 15/00

(52) U.S. Cl. ....................... 704/251; 704/270; 704/277; 704/231

(58) Field of Search ......................... 704/231, 251–257, 704/270, 275, 277; 379/88.05, 88.06

(56) References Cited

U.S. PATENT DOCUMENTS 4,866,755 A * 9/1989 Hashimoto ............... 379/88.06
4,916,730 A * 4/1990 Hashimoto ............... 379/88.05
5,553,119 A * 9/1996 McAllister et al. ......... 704/270
5,675,705 A * 10/1997 Singhal ...................... 704/254

FOREIGN PATENT DOCUMENTS

WO WO0033295 8/2000 ........... G01L/15/00

OTHER PUBLICATIONS

Ramesh et al., "Languae Identification With Embedded Word Models," ICSLP 94: 1994 Internatioanl Conference On Spoken Language Processing. Yokohama, Japan, Sep. 18–22, 1994, International Conference On Spoken Language Processing. vol. 4, Sep. 18, 1994, pp. 1887–1890.

* cited by examiner

*Primary Examiner*—David D. Knepper

(57) ABSTRACT

A voice controlled electronic device includes a controller (12, 13, 14) for initiating individual functions of the electronic device. The controller also establishes a language attribute associated with a language for interaction with the user. The controller ensures that at least part of the interaction with the user takes place substantially in the associated language. The electronic device includes an input (1) for receiving voice commands. A speech recognizer (4) recognizes at least one voice command in the speech input. The voice command is associated with a predetermined first control function of a device, and a distinct second function of establishing the language attribute. The controller sets the language attribute according to the second function of the recognized command.

14 Claims, 2 Drawing Sheets

SPEECHDRIVEN SETTING OF A LANGUAGE OF INTERACTION

Figure 1:
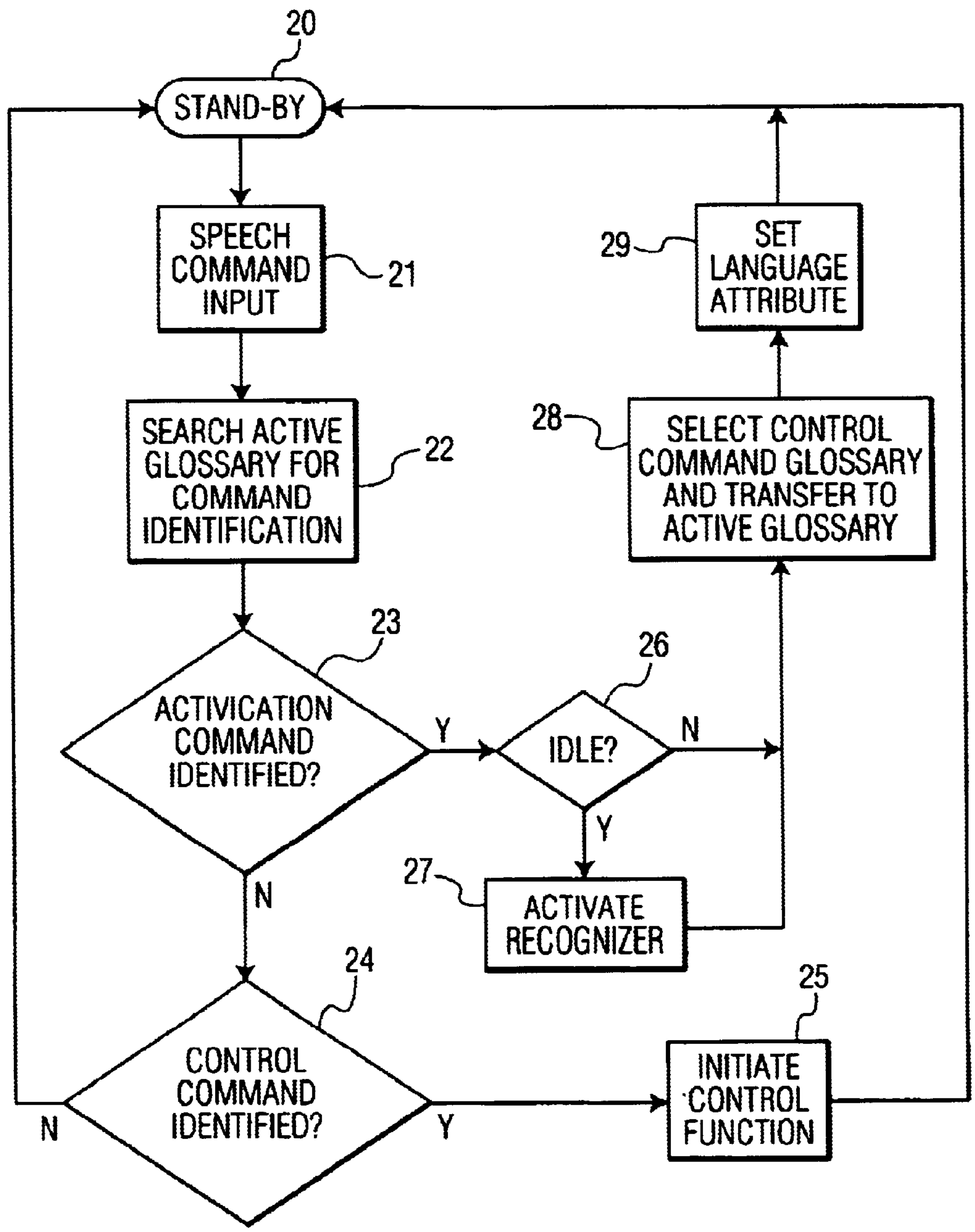

The invention relates to a method for enabling a user to interact with an electronic device using speech and to a software and a device incorporating the method.

In speech operated systems by far the most commonly used language is English. Although this may be acceptable for many applications and many users, such a language limitation is in general not very user friendly and a user-machine interface adapted to the native language of the user would in principle be preferable.

In the prior art various speech recognition methods and devices have been disclosed offering the possibility of operation with a selected language out of a plurality of language options.

Thus, in a semantic recognition system disclosed in EP 0 953 896 A1 a speech control method of this kind may be carried out, which involves initial selection by the user of a desired operation language among a plurality of language options afforded by the system, by user operation of language selector, whereby selection is made of an external description file as well as a speech recognition engine associated with the selected language.

The system thus requires the use of a separate selectable external description file and a separate speech recognition engine for each language option to be afforded. Evidently, by such a requirement the complexity in structure and operation of this prior art system as well as the costs relating thereto become significant and would make such a system unqualified for use in the speech control of many electronic systems and products, including consumer electronic products, where speech control may be desired.

In JP 09034488 A and JP 09134191 A, somewhat similar voice operation and recognition devices are disclosed, in which switching between a plurality of dictionaries or language models may be controlled by manual switch operation or alternatively, according to the latter publication, by use of a speaker identification part.

For a voice recognition system operating with a single predetermined language U.S. Pat. No. 5,738,319 discloses a method for reducing the computation time by limiting the search to a subvocabulary of active words among the total plurality of words recognizable by the system.

It is an object of the invention to provide a method of interaction and an electronic device with a user interface supporting several languages and allowing voice control with simple and user-friendly operation of the language setting. It is a further object that such a voice control is suitable for use in consumer electronic devices sold to many areas with different languages.

The object according to the invention is met in that the method for enabling a user to interact with an electronic device using speech includes:

establishing a language attribute associated with a language for interaction with the user;

causing at least part of the interaction with the user to take place substantially in the associated language;

receiving speech input from the user, recognizing at least one voice command in the speech input, where the voice command is associated with a predetermined first function of a device; and a distinct second function of establishing the language attribute; and setting the language attribute according to the second function of the recognized command.

According to the invention, at least one voice command has two distinct functions. The first function will normally be the conventional function associated with the voice command. The second function is to set the language attribute. For example, if a user speaks the command 'Play' the first function is to start playback of, for instance, a CD player. The second function is to set the language attribute to English. Similarly, if the user says 'Spiel' the first function is also to start playback and the second function is to set the language attribute to German. The language attribute determines the language of interaction. According to the invention, it is not necessary that the user uses separate commands (manual or voice commands) to set the language attribute. Instead, the language attribute is determined as a secondary function of a voice command. The secondary function is predetermined in the sense that once the recognizer has recognized the command, the language attribute is known. It is not necessary to separately establish the language from features of the speech input. Normally, the first function will be a function of the device receiving the speech or containing the speech recognizer. It will be appreciated that the first function may also relate to another device, which is controlled by the device receiving or processing the speech via a network.

In one embodiment of the invention, at least one of the activation commands is used to determine the language of interaction, in addition to the conventional function of activating voice control of a device. Normally, voice control only becomes active after the user has spoken an activation command. This reduces the chance that a normal conversation, which may include valid voice commands, inadvertently results in controlling the device. After activation, the speech recognizer may be active until it becomes idle again, for instance following a deactivation command or after a period of no input of voice commands. As long as the recognizer is idle, it recognizes only voice commands from a limited set of activation commands. This set may contain several activation commands for activating control of the same device but being associated with respective different languages. For instance, an activation command could be 'television', associated with English, whereas a second allowed activation command is 'televisie', associated with Dutch. While the speech recognizer is active, it is able to recognize commands from a, usually substantially larger, set different from the set of activation commands.

The set of activiation commands may be selected in dependence on the language attribute. As such, the language attribute also influences the speech interaction, instead of or in addition to possible visually displayed texts or audible feedback. It will be appreciated that a language specific set of commands may also include some commands from a different language. For instance, the Dutch set of commands for controlling a CD player may include the English command 'play'.

In one preferred embodiment of the invention, the activation command itself is in the language according to which the language attribute will be set. This allows very intuitive change of setting of the language attribute. It will be appreciated that the setting of a language attribute may be kept also after the speech recognizer has become idle. The attribute can then still determine the interaction for other aspects than the voice commands. It may also be used to provide feedback in that language if voice input is detected at a later moment but not properly recognized.

Preferably, the language attribute is set again each time a voice command is recognized having the described second function of setting the attribute. This makes it very easy to quickly change language of interaction. For instance, one user can speak in English to the device and issue a voice command with the second function of setting the attribute to English. This may result in information, like menus, being presented in English. Another family member may at a later stage prefer to communicate in Dutch and issue a voice command with the second function of setting the attribute to Dutch. Such a change-over can be effected smoothly via the second function of the activation commands.

It is preferred to allow personalized names as activation commands having the second function as described above.

The language selection as a side-effect of a spoken command makes the method very user friendly and attractive for incorporation in electronic systems and products sold in different countries or regions using different languages or dialects as well as for application in bi- or multilingual areas or in multi-user environments, where users may be expected to operate the system in a number of different languages, ranging from a private household having members with different native language to a public multi-user installation such as an information boot or kiosk, especially in a place with many tourists or visitors.

The commands with the language selection function would preferably comprise for each language a single word or phrase commonly used in that language and could advantageously be a personalized name in the language. Once a command with the second function is recognized, subsequent operation of the control method to initiate individual control functions of a multifunction device will substantially take place in the selected language.

The method of the invention offers a very easy and fast switching between the various language options just by the use of a spoken single word or phrase activation command.

The voice control according to the invention is preferably used in a multifunction consumer electronics device, like a TV, set top box, VCR, or DVD player, or similar device. Whereas, the word "multifunction electronic device" as used in the context of the invention may comprise a multiplicity of electronic products for domestic or professional use as well as more complex information systems, the number of individual functions to be controlled by the method would normally be limited to a reasonable level, typically in the range from 2 to 100 different functions. For a typical consumer electronic product like a TV or audio system, where only a more limited number of functions need be controlled, e.g. 5 to 20 functions, examples of such functions may include volume control including muting, tone control, channel selection and switching from inactive or stand-by condition to active condition and vice versa, which could be initiated, in the English language, by control commands such as "louder", "softer", "mute", "bass" "treble" "change channel", "on", "off", "stand-by" etc. and corresponding expressions in the other languages offered by the method.

The word "language" may comprise any natural or artificial language, as well as any dialect version of a language, terminology or slang. The number of language options to be offered by the method may, depending on the actual electronic device with which the method is to be used, vary within wide limits, e.g. in the range from 2 to 100 language options. For commercial products marketed on a global basis, the language options would typically include a number of major languages such as English, Spanish, French, German, Italian, Portuguese, Russian, Japanese, Chinese etc.

Figure 2:
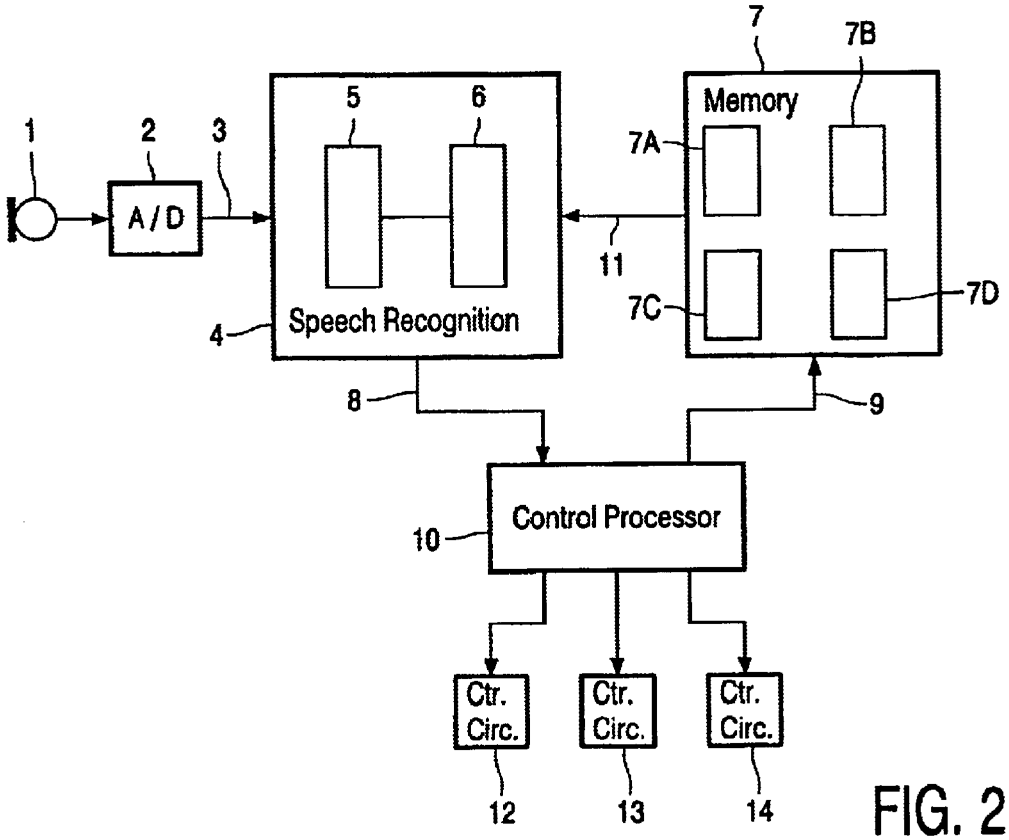
Figure 3:
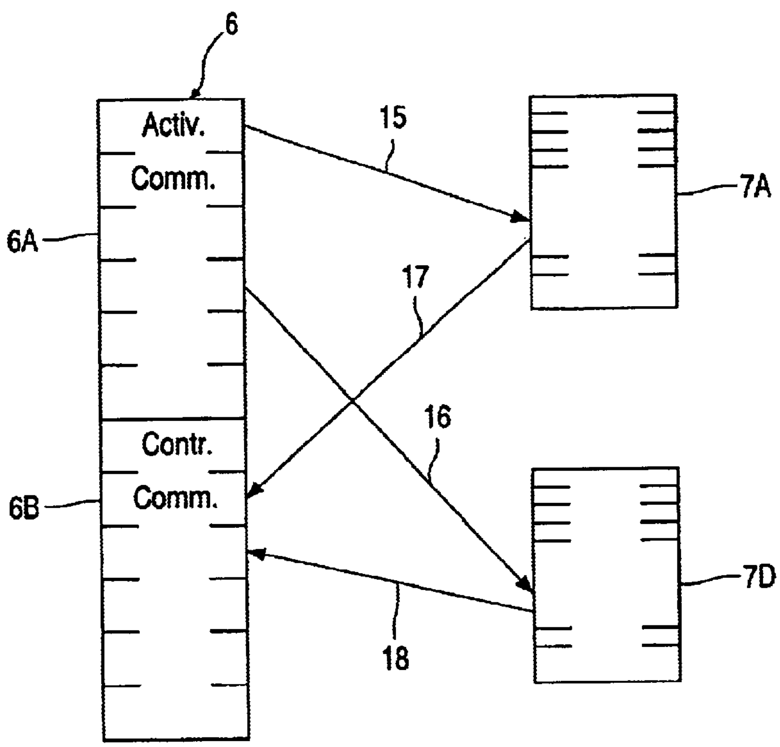

In the following the speech control method and system of the invention will be further elucidated by way of enabling embodiments as illustrated in the accompanying drawings, in which FIG. 1 is a schematic flow diagram illustrating the acceptance and interpretation of speech input commands by the speech control method according to the invention, FIG. 2 is an exemplified block diagram representation of an embodiment of a speech control system for implementation of the method, and FIG. 3 is a schematic representation illustrating the cooperation and communication between an active memory part of the speech recognition engine and the memory of selectable language vocabularies in FIG. 2.

DETAILED DESCRIPTION OF THE FIGURES

The flow diagram in FIG. 1 illustrates the features of application of the speech control method of the invention to the control of individual controllable functions of a multifunction electronic device, which may be a consumer electronic product for domestic use such as a TV or audio system or a washing or kitchen machine, any kind of office equipment like a copying machine, a printer, various forms of computer work stations etc, electronic products for use in the medical sector or any other kind of professional use as well as a more complex electronic information system. In the description it is assumed that the speech recognizer is located in the device being controlled. It will be appreciated that this is not required and that the control method according to the invention is also possible where several devices are connected via a network (local or wide area), and the recognizer and/or controller are located in a different device then the device being controlled. As will be understood, the method described provides a simple way of setting a language attribute for the device under control. This language attribute may influence the language in which the user can speak voice commands, audible feedback to the user, and/or visual input/feedback to the user (e.g. via pop-up text or menu's). In the remainder emphasis is given on influencing the language in which the user can issue voice commands.

Assuming that initially the recognizer in the electronic device under control is idle, which will typically be the case, the user can input a speech command for the purpose of activating the recognizer (primary function) as well as selecting one of the languages of operation (secondary function of the same command). Such a command is referred to as an activation command. If the recognizer is already active, the user may issue normal voice commands which usually only have the primary function of controlling the electronic device. Optionally, activation commands may also be issued when the recognizer is already active, possibly resulting in a change of language. It will be appreciated that some of those non-activation commands may also have the secondary function of changing the language of interaction. The remainder will focus on the situation wherein only activation commands have that secondary function.

Upon receipt of the speech command input a search is made in the active vocabulary incorporated in the speech recognition engine used for implementation of the method. If the recognizer is idle, as mentioned above the active vocabulary comprises a list of all activation commands used for selection of one of the languages. Upon positive identification of a speech command input as an activation command contained in the list of activation commands in the active vocabulary, this will normally result in loading one or more defined lists of control commands which can be recognized enabling user operated control of the electronic device in the selected language. Thus the active vocabulary is changed. The active vocabulary may still include some or all activation commands, allowing a switch of language during one active recognition session (i.e. while the recognition is active).

If the speech command input is identified as a normal control command the control function for the electronic device associated with that command is initiated.

If no identification is made either of an activation command or of a normal control command the procedure is routed back to the start condition to be ready for the next speech command input.

Normally, the recognizer transits from the active mode to the idle mode after a predetermined period of non-detection (for instance, no voice signal detected or no command recognized), or after having recognized an explicit deactivation command. When the recognizer goes to the idle mode, the active vocabulary is reset to the initial, more restricted vocabulary.

In an embodiment of the invention, the list of activation commands contains one or more product names (or phrases) for each device which can be controlled, where for all languages supported for each device at least one name is included in that respective language. For example, if the system can control a television and VCR in English, German and Dutch, the list of activation command could be:

"Television" in English,

"Television" in German

"Televisie" in Dutch

"Video cassette recorder" in English,

"Videokassettenrecorder" in German,

"Video recorder" in Dutch.

Note that although the textual form of the word/phrase may be the same, the differences in pronunciation enable the recognizer to identify the correct phrase and as such enable the controller to determine the language associated with the phrase. The vocabulary includes an acoustic transcription of the command. The list of activation commands preferably also includes common alternative forms, like "VCR" for "Video recorder".

In a preferred embodiment the activation commands used for the selection of the desired operation language could be personalized names conventionally used in these languages. Thereby, each user of the electronic device would only have to remember the name associated with the operation language of her or his preference. As an example, such a list of activation commands could include the following name-language combinations.

"Truus"—Dutch

"Emily"—English

"Herman"—German

"Pierre"—French

"Marino"—Italian

"Gina"—Spanish

Another preferred possibility would be to make the activation commands user definable.

In the embodiment of a speech control system illustrated by the exemplified schematical block diagram in FIG. 2, the speech command input is received by a microphone 1 and is supplied therefrom as an analog electrical signal to an A/D converter 2, which in a manner known per se converts the analog signal into a digital signal representation possibly with some amplification.

Via a bus communication 3 such as an $I^2S$ bus, specified in "$I^2S$ bus specification, revised Jun. 5, 196, Philips Semiconductors, the digital representation is supplied to a speech recognition engine 4 comprising search and comparing means 5 and an active memory part 6 containing the active vocabulary described above with its content of activation commands and one of the sets of control commands contained in the user selectable vocabularies which are stored in individual memory parts 7A, 7B, 7C and 7D in a memory 7 in communication with the speech recognition engine 4.

As shown in FIG. 3 the active memory part 6 will thus comprise two memory sections 6A and 6B containing the activation commands, which once determined typically do not change, and the control commands, respectively, which are transferred from one of the memory parts 7A . . . 7D in memory 7. Preferably, section 6A of the active memory part 6 will be of a type, which does not cancel its stored content of information, when switching the electronic device from an active to a stand-by or off-condition, such as an EPROM-type memory, whereas section 6B, the content of which must be replaceable at each input of a new activation command would be a RAM-type memory.

Via bus connections 8 and 9 such as $I^2C$ bus connections, specified in "$I^2C$ bus specification", version 2.1, January 2000, Philips Semiconductors, the speech recognition engine 4 and the memory 7 are connected with a control processor 10 controlling all operations and functions of the system.

In the active memory part 6 of the speech recognition engine 4 all searchable activation commands and the set of control commands currently contained therein are organized in defined memory locations and, on positive identification of a speech input command by the speech recognition engine, be it a activation command or a control command, corresponding information is supplied to the processor 10 via bus connection 8.

When the information thus supplied to the processor 10 indicates that the speech command input has been identified as a activation command the memory part 7A . . . 7D containing the vocabulary of control commands associated with the identified activation command is addressed from the processor 10 via bus connection 9 and the vocabulary contained therein is transferred to the searchable active memory part 6 in the speech recognition engine 4 via bus connection 11, which like bus connections 8 and 9 may be an $I^2C$ bus.

When the information supplied from the speech recognition engine 4 to the processor 10 indicates that the speech command input has been identified as a control command, the processor 10 supplies an enabling signal to any of control circuits 12, 13, 14 etc in the multifunction electronic device controlled by the system to initiate the control associated with the identified control command.

The schematic representation in FIG. 3 illustrates in more detail the cooperation and communication between the active memory part 6 in the speech recognition engine 4 and the addressable memories 7A . . . 7D in memory 7 containing the selectable vocabularies of control commands. In the active memory part 6 a list of all activation commands to be identifiable by the system is contained in individual defined memory locations in a memory section 6A. The arrows 15 and 16 illustrate selection of memory part 7A or memory part 7D in memory 7 upon identification of the corresponding activation command, whereas the arrows 17 and 18 illustrate the transfer of the vocabulary of control commands contained in either memory part 7A or memory part 7D to a separate memory section 6B in the active memory part 6.

In order to avoid the need for transfer of a set of control commands from one of memory parts 7A . . . 7D in memory 7 to section 6B of the active memory part 6 in a situation where operation of the electronic device is to be resumed from a stand-by condition without change of the operation language last used, and the communication time required for this transfer, the section 6B of the active memory part 6 may be operated to keep its stored set of control commands, when switching the electronic device to the stand-by condition.

The speech recognizer 4 and control processor 10 may be implemented using one processor. Normally, both functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet.

In the foregoing, the speech control method and system of the invention have been explained by way of examples only. The scope of the invention including the applicability of the method and the actual organization and structure of the system is not limited, however, to the disclosed specific examples. Thus, several of the system components illustrated by individual blocks in FIG. 2 may be incorporated in one or more common component blocks or some of the illustrated components blocks may be subdivided into two or more blocks.

What is claimed is:

1. A method for enabling a user to interact with an electronic device using speech, the electronic device being capable of interacting with the user in multiple languages, the method comprising the steps of:

defining a set of activation commands for activating or controlling the electronic device, the set of activation commands including at least one activation command in each of the languages supported by the electronic device;

receiving speech input from the user;

recognizing at least one voice command in the speech input;

determining whether the recognized voice command is in the set of activation commands and if so, activating or controlling the electronic device in accordance with the recognized voice command;

determining the language of the recognized voice command;

setting a language attribute which determines in which language the electronic device interacts with the user based on the language of the recognized voice command such that the recognized voice command has dual functions of causing the activation or control of the electronic device and setting of the language attribute of the electronic device;

providing a plurality of additional sets of voice commands for activating or controlling the electronic device, each in one of the languages supported by the electronic device;

enabling recognition of one of the additional sets of voice commands in speech input in response to recognizing one of the activation commands; and selecting the additional set of voice commands for which recognition is enabled in the language associated with the language attribute.

2. The method as recited in claim 1, wherein at least one of the activation commands includes a word from each of the plurality of languages.

3. The method as recited in claim 1, wherein at least one of the activation commands is user-definable.

4. A computer program product wherein the program product is operative to cause a processor to perform the method as claimed in claim 1.

5. The method as recited in claim 1, wherein the electronic device is a multifunction electronic device, the speech input from the user being recognized by a speech recognizer, further comprising arranging the speech recognizer an the multifunction device.

6. The method as recited in claim 1, further comprising the step of enabling the electronic device to provide audio and/or visual feedback to the user in the plurality of languages supported by the electronic device.

7. The method as recited in claim 6, further comprising the step of setting the electronic device to provide the audio and/or visual feedback in the language of the recognized voice command and associated with the language attribute after the language of the recognized voice command is determined and the language attribute is set.

8. The method as recited in claim 1, wherein the electronic device includes interacting means for interacting with the user in the plurality of different languages, further comprising the step of setting the language in which the interacting means interacts with the user to the language associated with the language attribute.

9. The method as recited in claim 8, wherein the interacting means comprise a speech recognizer.

10. The method as recited in claim 9, wherein the step of setting the language in which the interacting means interacts with the user comprises loading a defined list of control commands in the language associated with the language attribute into the speech recognizer.

11. The method as recited in claim 1, further comprising the step of determining which languages are supported by the electronic device and causing the electronic device to interact with the user in the language associated with the language attribute.

12. The method as recited in claim 1, further comprising constructing the electronic device to interact with the user based on an established language attribute and establishing the language attribute of the electronic device as the language attribute set based on the language of the recognized voice command.

13. A method for enabling a user to interact with-an electronic device using speech, the electronic device being capable of interacting with the user in multiple languages, the method comprising the steps of:

defining a set of activation commands for activating or controlling the electronic device, the set of activation commands including at least one activation command in each of the languages supported by the electronic device, at least one of the activation commands being a personalized name in each of the plurality of languages;

receiving speech input from the user;

recognizing at least one voice command in the speech input;

determining whether the recognized voice command is in the set of activation commands and if so, activating or controlling the electronic device in accordance with the recognized voice command;

determining the language of the recognized voice command;

setting a language attribute which determines in which language the electronic device interacts with the user based on the language of the recognized voice command such that the recognized voice command has dual functions of causing the activation or control of the electronic device and setting of the language attribute of the electronic device; and enabling recognition of an additional set of voice commands in speech input in response to recognizing one of the activation commands.

14. A method for enabling a user to interact with an electronic device using a speech, the electronic device being capable of interacting with the user in multiple languages, the method comprising the steps of:

defining a set of activation commands for activating or controlling the electronic device, the set of activation commands including at least one activation command in each of the languages supported by the electronic device;

receiving speech input from the user;

recognizing at least one voice command in the speech input;

determining whether the recognized voice command is in the set of activation commands and if so, activating or controlling the electronic device in accordance with the recognized voice command;

determining the language of the recognized voice command;

setting a language attribute which determines in which language the electronic device interacts with the user based on the language of the recognized voice command such that the recognized voice command has dual functions of causing the activation or control of the electronic device and setting of the language attribute of the electronic device; and after the language attribute of the electronic device is set, receiving additional speech input from the user;

recognizing at least one voice command in the speech input; and determining whether the recognized voice command is in a set of control commands which is larger than the set of activation commands and if so, adjusting the operation of the electronic device in accordance with the recognized voice command.

* * * * *